(12) United States Patent
Inoue

(10) Patent No.: US 8,678,717 B2
(45) Date of Patent: Mar. 25, 2014

(54) CUTTING INSERT, CUTTING TOOL, AND METHOD OF CUTTING WORK MATERIAL USING CUTTING TOOL

(75) Inventor: Yoshihiro Inoue, Higashiomi (JP)

(73) Assignee: Kyocera Corporation, Kyoto (JP)

( * ) Notice: Subject to any disclaimer, the term of this patent is extended or adjusted under 35 U.S.C. 154(b) by 1216 days.

(21) Appl. No.: 12/593,236

(22) PCT Filed: Mar. 26, 2008

(86) PCT No.: PCT/JP2008/055704
§ 371 (c)(1),
(2), (4) Date: Sep. 25, 2009

(87) PCT Pub. No.: WO2008/117822
PCT Pub. Date: Feb. 10, 2008

(65) Prior Publication Data
US 2010/0061815 A1 Mar. 11, 2010

(30) Foreign Application Priority Data

Mar. 27, 2007 (JP) .................................. 2007-083056
Jul. 30, 2007 (JP) .................................. 2007-197326

(51) Int. Cl.
*B23B 27/04* (2006.01)
*B23B 27/22* (2006.01)
(52) U.S. Cl.
USPC ........................... 407/116; 407/117; 407/115
(58) Field of Classification Search
USPC ................... 407/113, 114, 115, 117
See application file for complete search history.

(56) References Cited

U.S. PATENT DOCUMENTS 3,407,467 A * 10/1968 Wirfelt ......................... 407/114
4,720,217 A *  1/1988 Bonjour et al. ............... 407/114

(Continued)

FOREIGN PATENT DOCUMENTS

DE 69814116 T2 3/2004
DE 69410238 T3 10/2004

(Continued)

OTHER PUBLICATIONS

German language office action dated May 30, 2012 and its English language issued in corresponding German application 112008000819.1 cites the U.S. patent and foreign patent documents above.

(Continued)

*Primary Examiner* — Andrea Wellington
*Assistant Examiner* — Sara Addisu
(74) *Attorney, Agent, or Firm* — DLA Piper LLP (US)

(57) ABSTRACT

A cutting insert that includes a cutting edge; a rake face region formed continuously with the cutting edge; and a clamp face region located more inward and higher than the rake face region is provided. The cutting insert includes a first rake face formed continuously with the cutting edge; a second rake face formed in an inclined surface shape from the first rake face toward the clamp face region; a projection formed so that at least a part of the projection is located on the first rake face, and includes a top portion at a position corresponding to a middle region of the cutting edge; and a concave part or a convex part formed so that at least a part is located on the second rake face, and located more inward than the projection. Chip accumulation into the insert and frictional resistance generated in the rake face region is decreased.

13 Claims, 13 Drawing Sheets

(56) References Cited

U.S. PATENT DOCUMENTS

| | | | |
|---|---|---|---|
| 4,832,541 A * | 5/1989 | Noguchi et al. | 407/114 |
| 4,934,879 A * | 6/1990 | van Barneveld | 407/66 |
| 4,941,780 A * | 7/1990 | Takahashi | 407/114 |
| 4,957,396 A * | 9/1990 | Niebauer | 407/114 |
| 5,040,930 A * | 8/1991 | Zinner | 407/114 |
| 5,282,703 A * | 2/1994 | Itaba et al. | 407/114 |
| 5,702,210 A * | 12/1997 | Boianjiu | 407/100 |
| 5,709,509 A * | 1/1998 | Wegener et al. | 407/114 |
| 5,725,334 A * | 3/1998 | Paya | 407/117 |
| 5,788,427 A * | 8/1998 | Zitzlaff et al. | 407/114 |
| 5,797,707 A * | 8/1998 | Stallwitz et al. | 407/114 |
| 5,810,521 A | 9/1998 | Pantzar et al. | |
| 5,827,017 A * | 10/1998 | Tagstrom et al. | 407/116 |
| 5,839,857 A * | 11/1998 | Paya | 407/114 |
| 5,868,531 A | 2/1999 | Sandford | |
| 6,042,309 A | 3/2000 | Sandford | |
| 6,146,064 A * | 11/2000 | Flolo | 407/114 |
| 6,328,504 B1 | 12/2001 | Kinukawa | |
| 6,733,215 B2 * | 5/2004 | Isaksson | 407/114 |
| 6,843,620 B2 * | 1/2005 | Inayama | 407/114 |
| 7,665,933 B2 * | 2/2010 | Nagaya et al. | 407/116 |
| 7,934,891 B2 * | 5/2011 | Jonsson et al. | 407/114 |
| 8,137,035 B2 * | 3/2012 | Uchijo et al. | 407/116 |
| 8,197,163 B2 * | 6/2012 | Nasu et al. | 408/223 |
| 2001/0014259 A1* | 8/2001 | Inayama | 407/116 |
| 2002/0122700 A1* | 9/2002 | Inayama | 407/117 |
| 2002/0197119 A1* | 12/2002 | Kinukawa | 407/114 |
| 2003/0170081 A1* | 9/2003 | Andersson et al. | 407/114 |
| 2006/0269367 A1* | 11/2006 | Havrda | 407/117 |
| 2007/0298230 A1* | 12/2007 | Omori et al. | 428/212 |
| 2012/0087751 A1* | 4/2012 | Yamaguchi | 407/115 |

FOREIGN PATENT DOCUMENTS

| | | |
|---|---|---|
| EP | 1038616 A1 * | 9/2000 |
| EP | 1184110 A1 | 3/2002 |
| JP | 62-029204 | 2/1987 |
| JP | 63182817 U | 11/1988 |
| JP | 2104904 U | 8/1990 |
| JP | 03-202208 | 9/1991 |
| JP | 03-120304 | 12/1991 |
| JP | 07-237006 | 9/1995 |
| JP | 08071807 A | 3/1996 |
| JP | 09-174308 | 7/1997 |
| JP | 2001-322010 | 11/2001 |
| JP | 2002-018607 | 1/2002 |
| JP | 2003-011005 | 1/2003 |
| JP | 2005-103655 | 4/2005 |
| JP | 2006231458 A | 9/2006 |

OTHER PUBLICATIONS

Preliminary Report and Written Opinion issued Oct. 29, 2009 for corresponding PCT application No. PCT/JP2008/055704. Cited references filed on Sep. 25, 2009.

Chinese language office action dated Aug. 27, 2010 and its English language translation for corresponding Chinese application 200880010255.9.

Chinese language office action dated Apr. 15, 2013 and its English language translation issued in corresponding Chinese application 20880010255.9.

Japanese language office action dated Jul. 23, 2013 and its English language Statement of Relevance of Non-English References Pursuant to 37 CFR 1.98(a)(3)(i) issued in corresponding Japanese application 2012136796 cites the foreign patent documents listed above.

* cited by examiner (a)

(b)

(a)

(b)

(a)

(b)

(a)

(b)

CUTTING INSERT, CUTTING TOOL, AND METHOD OF CUTTING WORK MATERIAL USING CUTTING TOOL

CROSS-REFERENCE TO THE RELATED APPLICATIONS

This application is a national stage of international application No. PCT/JP2008/055704, filed on Mar. 26, 2008, which also claims the benefit of priority under 35 USC 119 to Japanese Patent Application No. 2007-083056, filed on Mar. 27, 2007 and Japanese Patent Application No. 2007-197326, filed on Jul. 30, 2007 the entire contents of which are incorporated herein by reference.

TECHNICAL FIELD

The invention relates to a cutting insert and so forth used for groove machining in the cutting of metal materials or the like.

BACKGROUND ART

A cutting insert for groove machining is often used for machining in which chip discharge space is narrow because of the machining form. Therefore, the cutting insert is required to have a structure permitting smooth discharge of generated chips.

The cutting insert described in Patent Document 1 has a rake face, and a clamp face formed on the top surface of an insert body part, a flank face formed on the side surface of the insert body part, and a cutting edge formed at the intersection between the rake face and the flank face. The rake face has a first rake face being continuous with the cutting edge, and a second rake face (an inclined wall) which is located in the back of the first rake face and extends therefrom in an inclined surface shape toward the clamp face. Projections (convex parts) are formed at portions of the first rake face which are adjacent to both ends of the cutting edge, respectively.

In addition to the structure of the above cutting insert, the other cutting insert described in Patent Document 1 further has on the rake face a concave part extending from the portions adjacent to both ends of the cutting edge to the tip end portion of the clamp face so as to divide the second rake face. Projections are formed in the concave part and at the portions adjacent to both ends of the cutting edge, respectively.

These two cutting inserts described in Patent Document 1 have the following problem. That is, in these cutting inserts, the projections are formed at the portions of the first rake face adjacent to both ends of the cutting edge, and hence the opposite ends of a chip are lifted and the widthwise center of the chips is subjected to a large force by which the chip is downwardly deformed (contraction action). Consequently, the chip is deformed into a substantially U-shaped cross section.

However, because the second rake face is constituted by a flat surface, the contact area between the chip deformed by the first rake face and the second rake face is large to thereby increase frictional resistance. Therefore, these cutting inserts have the problem that the chip is liable to accumulate on the rake face, and chip discharging performance is deteriorated, thus causing damage to the insert.

In the other cutting insert of Patent Document 1, by the concave part extending up to the clamp face so as to divide the second rake face, chips are also allowed to be deformed downward at the widthwise center thereof on the second rake face. With this insert, the chip deformed by the projections is also subjected to the contraction action on the second rake face.

The second rake face is formed in the inclined surface shape. Hence, on the second rake face, the chip is subjected to the force by which the chip is curled upward along the chip length direction (curling action), in addition to the contraction action.

That is, in the other cutting insert of Patent Document 1, the generated chip is subjected to the contraction action on the first rake face, and then subjected to both the contraction action and the curling action on the second rake face. Thus, on the second rake face, these two forces substantially orthogonal to each other are exerted onto the chip, and hence the chip discharge direction is unstable. As a result, there has been the problem that the chip is accumulated into the portion of the concave part which is located on the second rake face.

Patent Document 1: Japanese Unexamined Patent Application Publication No. 2001-322010

DISCLOSURE OF THE INVENTION

Problems to be Solved by the Invention

An advantage of the invention is to provide a cutting insert and a cutting tool which exhibit excellent chip discharge performance by decreasing the frictional resistance of chips, and also provide a method of cutting a work material using the cutting tool.

Means for Solving the Problems

A cutting insert of the invention comprising: a cutting edge formed in a ridge part of a top surface of the cutting insert; a rake face region formed continuously with the cutting edge of the top surface; and a clamp face region formed on the top surface so as to be located more inward and higher than the rake face region. The rake face region includes a first rake face formed continuously with the cutting edge; a second rake face formed in an inclined surface shape from the first rake face toward the clamp face region; a projection being formed so that at least a part of the projection is located on the first rake face, and comprising a top portion disposed at a position corresponding to a middle region of the cutting edge when viewed from above; and a concave part or a convex part being formed so that at least a part thereof is located on the second rake face, and being located more inward than the projection when viewed from above.

A cutting tool of the invention comprises the above cutting insert and a holder mounting the cutting edge on a tip end thereof.

A method of cutting a work material by using the above cutting tool, the method comprises the step of rotating a work material; the step of moving the cutting tool closer to the work material; the step of cutting the work material by contacting the cutting edge of the cutting tool with the work material; and the step of moving the cutting tool away from the work material.

Effect of the Invention

The cutting insert of the invention achieves a well-balanced exertion of both the contraction action and the curling action onto chips. This decreases the wear resistance caused in the step of discharging chips and thereby decreases the chips accumulated on the rake face region, thus exhibiting excellent chip discharge performance.

The cutting tool of the invention decreases lateral swing of chips in the discharge process, thus exhibiting excellent chip discharge performance. Further, owing to the decrease of the frictional resistance exerted onto the second rake face, the damage to the insert can be decreased, thereby improving tool life.

The method of cutting a work material of the invention exhibits excellent finished surface accuracy, thereby improving machining efficiency.

PREFERRED EMBODIMENTS FOR CARRYING OUT THE INVENTION

<Cutting Insert>
First Preferred Embodiment

Figure 1:
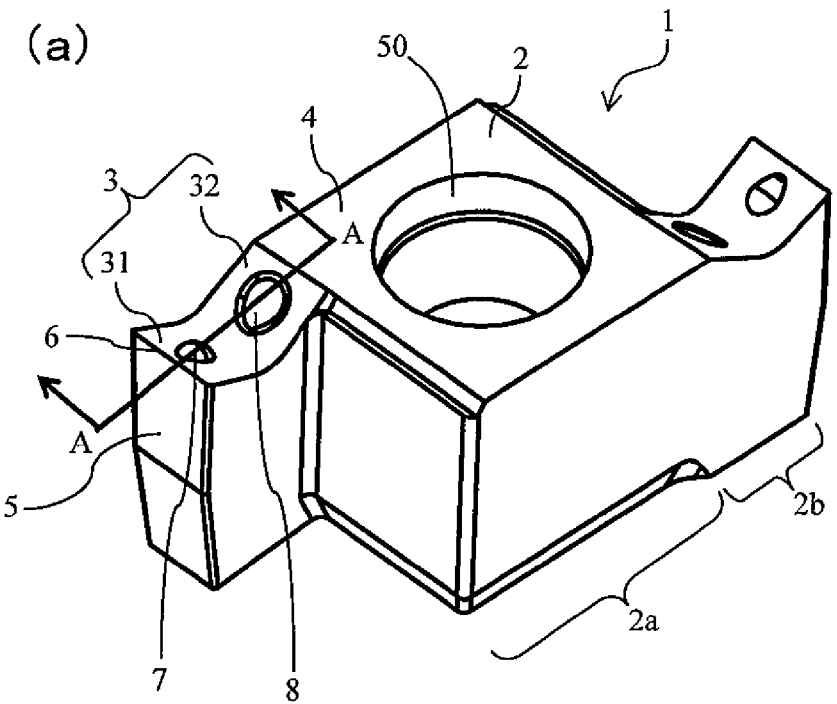
FIG. 1(a) is a perspective view showing the overall cutting insert according to a first preferred embodiment of the invention.
FIG. 1(b) is a plan view thereof.
Figure 1:
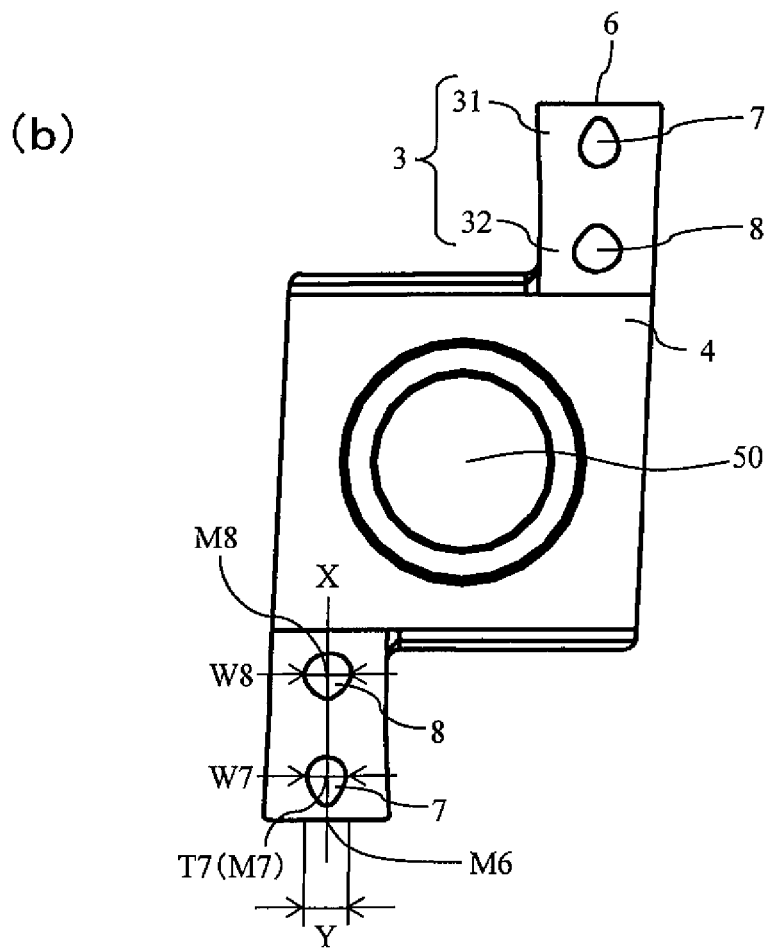
Figure 2:
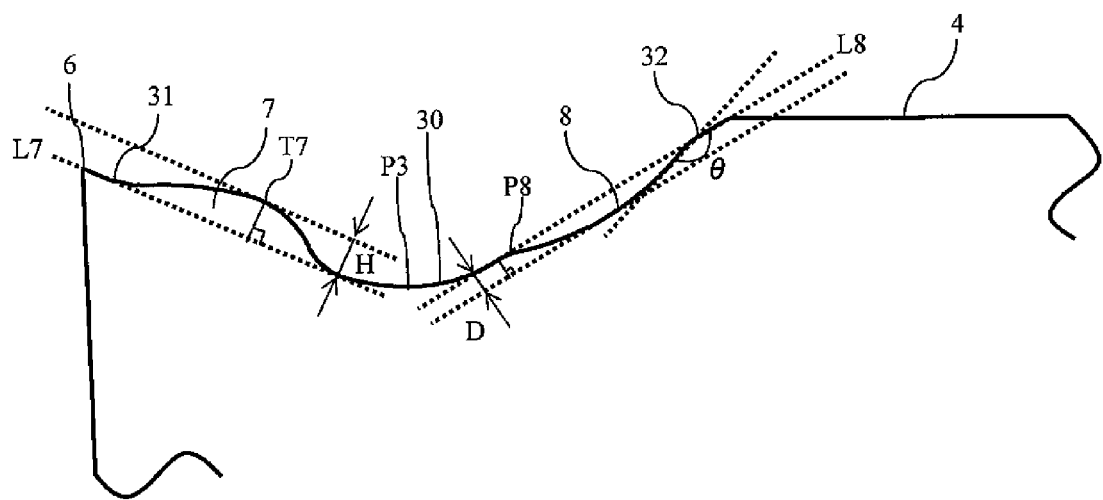
FIG. 2 is a sectional view taken along the line A-A in FIG. 1.

A first preferred embodiment of the cutting insert (hereinafter referred to as an insert) of the invention will be described in detail with reference to FIG. 1(a) to FIG. 3. As shown in FIG. 1(a) to FIG. 2, the insert 1 of the present preferred embodiment is used for groove machining, and has a rake face 3 (a rake face region) and a clamp face 4 (a clamp face region) which are formed on a part of the top surface of an insert body part 2, a front flank face 5 formed on the side surface of the insert body part 2, and a cutting edge 6 formed at the intersection (a ridge part of the top surface) between the rake face 3 and the front flank face 5. The rake face 3 is formed continuously with the cutting edge 6.

The insert body part 2 has a substantially polygon columnar shape, specifically, has a middle portion 2a mounted on a holder, and a cutting portion 2b formed so as to project from the middle portion 2a. The insert body part 2 has two cutting portions 2b, and the insert 1 is a 2 edge design insert. That is, the insert 1 is provided with two cutting edges 6. The insert body part 2 is not limited to the above, and may have a substantially regular polygon shape when viewed from above. In the insert body part 2, the top surface and the bottom surface may have similar figures as in the present preferred embodiment, or alternatively, the bottom surface may have a different shape from the top surface in accordance with an insert seat part 14 of a holder 11 to be described later.

A through hole 50 is formed in a mid-portion of the insert body part 2. A screw for fixing the insert 1 to the holder 11 is inserted into the through hole 50. The insert 1 has a 180-degree rotationally symmetrical shape with respect to the central axis of the through hole 50. This is economical because when one of the cutting edges in use is worn, the insert 1 can be rotated 180 degrees to use the other cutting edge not yet used.

The clamp face 4 is formed more inward and at a higher position than the rake face 3. The term "inward (hereinafter referred also to as back)" means the inner side of the insert body part 2 with respect to the cutting edge 6, in other words, toward the chip discharge direction. The term "higher position" means to be located higher in the thickness direction of the insert body part 2 with respect to the cutting edge 6. More specifically, when the insert 1 is placed stationary with the bottom surface of the insert body part 2 as a seat surface, the clamp face 4 is located at a higher position with reference to the cutting edge 6. If it is difficult to place stationary the insert 1 by using the bottom surface as a seat surface, the clamp face 4 may be formed at a higher position than the rake face 3 with the insert 1 mounted on the holder 11. The clamp face 4 is the surface used when the insert 1 is mounted onto the holder. Although the clamp face 4 is constituted by a single flat surface in the present preferred embodiment, the invention is not limited thereto. The clamp face 4 may be constituted by a plurality of surfaces depending on the face shape of a holder mounted. Alternatively, the clamp face 4 may be constituted by a curved surface.

The rake face 3 has a first rake face 31 formed continuously with the cutting edge 6, and a second rake face 32 formed in the inclined surface shape from the first rake face 31 toward the clamp face 4. The second rake face 32 is located inward the insert body part 2 with respect to the first rake face 31.

The rake face 3 further has a projection 7 located on the first rake face 31, and a concave part 8 located on the second rake face 32. The projection 7 is formed so that a top portion T7 is located at a position corresponding to a mid-region of the cutting edge 6 when viewed from above. The concave part 8 is formed to be located inward of the insert body part 2 than the projection 7. As used herein, the expression "inward of the insert body part 2" corresponds to toward the clamp face 4 with respect to the cutting edge 6 of the insert body part 2, that is, toward the chip discharge direction.

In the insert of the invention, at least a part of the concave part or the convex part may be located on the second rake face 32. That is, both end portions of the concave part or the convex part in the back of the projection 7 formed on the first rake face 31 and in the direction along the cutting edge 6 may have breaker faces each being located outside than both end portions of the projection 7 in the direction along the cutting edge 6. The present preferred embodiment shows the example where the concave part 8 is formed only on the second rake face 32. An example where at least a part of the convex part is located on the second rake face 32 will be described later with reference to FIGS. 6 to 9(b).

The first rake face 31 is a rake face portion formed continuously with the cutting edge 6, and a face region where the chip generated by the cutting edge 6 firstly passes through. The first rake face 31 is a region for imparting sufficient hardness to the chip so as to be stably curled in the chip length direction in the back of the rake face 3. The shape of the first rake face 31 may be a flat surface or a curved surface. As in the present preferred embodiment, the first rake face 31 is more preferably constituted by a flat surface. With this arrangement, the rake angle becomes locally extremely large on the cutting edge side and thereby decreases deterioration of the cutting edge strength.

The second rake face 32 is a rake face portion formed in the inclined surface shape from the cutting edge 6 toward the clamp face 4. By bringing the chip into contact with the face part in the inclined surface shape, the chip can be curled upward in the chip length direction. The second rake face 32 may be continuous with the clamp face 4 as shown in FIG. 1. Alternatively, other face region may be disposed between the second rake face 32 and the clamp face 4. However, smoother chip discharge is attainable by continuously forming the second rake face 32 and the clamp face 4 as in the present preferred embodiment. The shape of the second rake face 32 may be a flat surface or a curved surface. As in the present preferred embodiment shown in FIG. 2, the second rake face 32 is more preferably constituted by a flat surface. With this arrangement, the inclination of the second rake face 32 becomes locally large in the vicinity of the clamp face 4. This decreases occasions where chips get hard to flow backward, thereby enhancing the effect on the decrease of chip accumulation onto the second rake face 32.

Alternatively, other face region 30 may be disposed between the first rake face 31 and the second rake face 32, as shown in FIG. 2. That is, the first rake face 31 and the second rake face 32 are formed of a flat surface, and the face region 30 between these faces is formed of a gentle curved surface, and the rake face 3 may be formed by connecting the first rake face 31 and the second rake face 32 through the face region 30. This arrangement imparts a suitable rake angle to the first rake face 31, and also a smooth chip flow from the second rake face 32 toward back. This permits a smooth chip flow from the first rake face 31 to the second rake face 32, thereby further enhancing the effect on improvement of chip discharge performance.

In the insert 1, the projection 7 is formed on the first rake face 31. Since the projection 7 is formed at the position corresponding to the middle region of the cutting edge 6, the widthwise center of a generated chip is lifted by the projection 7, and the chip is deformed so that the cross section thereof has a convex shape (refer to FIG. 3). At this time, the chip collides and grazes with the projection 7 to thereby increase the chip hardness. The high hardness chip, whose cross section is deformed into the convex shape by the projection 7, makes stable contacts with the second rake face 32 at the chip widthwise opposite ends.

This enables decrease of chips falling into the concave part 8, thus allowing the chips to be stably curled upward by the second race face 32. Additionally, because the concave part 8 is formed on the second rake face 32 so as to be located behind the projection 7, the contact area between the second rake face 32 and the chip can be decreased to thereby decrease the frictional resistance caused by the second rake face 32. Therefore, the chips are subjected to a well-balanced exertion of two actions, namely the contraction action and the curling action on the rake face 3. As a result, the chip accumulation on the second rake face 32 is decreased to thereby enhance chip discharge performance, and the damage to the insert can be decreased to thereby improve tool life.

Especially, even when the work material is a material being rich in extensibility and the chip deformation amount on the first rake face 31 tends to become small, owing to the concave part 8 on the second rake face 32, the frictional resistance on the second rake face 32 can be properly decreased. Hence, even for the material being rich in extensibility, the chips are subjected to the well-balanced exertion of the contraction action and the curling action on the rake face 3. As a result, the chip accumulation on the second rake face 32 is decreased to thereby provide the insert having excellent chip discharge performance.

Thus, when the concave part 8 is formed on the second rake face 32, these two face regions of the second rake face 32, which are divided in the direction along the cutting edge 6 by the concave part 8, become breaker faces to be contacted with the widthwise opposite ends of the chips deformed by the first rake face 31.

Figure 3:
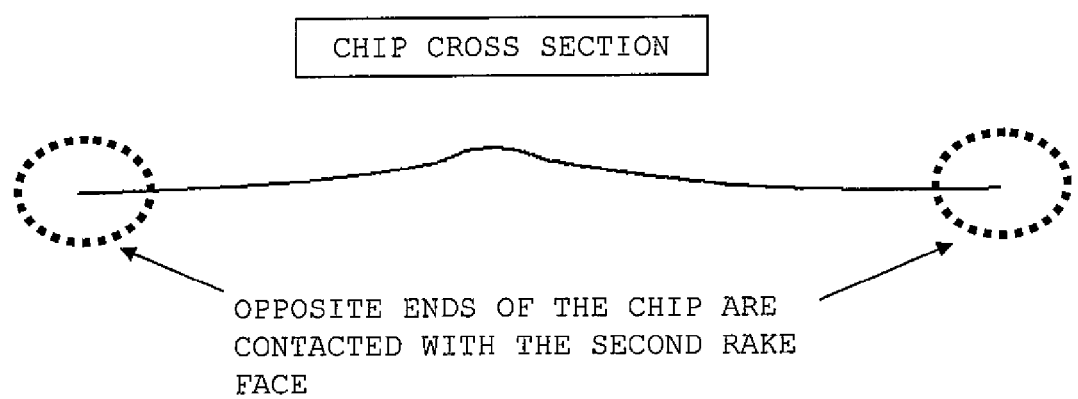
FIG. 3 is a schematic explanatory drawing showing the cross-sectional shape of chips generated by the cutting insert of the first preferred embodiment of the invention.

As shown in FIG. 3, the cross section of the chip generated by the insert 1 is deformed so that a substantial mid-portion thereof has the convex shape. That is, the chip is deformed by the projection 7 on the first rake face 31 so that the convex-shaped mid-portion of the chip is the highest position and the opposite ends thereof are the lowest positions. Since the chip thus deformed has high hardness due to the friction against the projection 7, the opposite ends of the chip located at the lowest position in the cross-section thereof are brought into contact with the second rake face 32. This decreases the chips falling into the concave part 8, and also decreases the frictional resistance generated in the second rake face 32.

Here, the arrangement that the projection 7 is disposed at the position corresponding to the middle region of the cutting edge 6 means to arrange so that the projection 7 contacts with the chips generated by the cutting edge 6 and lifts the chip widthwise mid-portion. Specifically, when viewed from above, a later-described top portion T7 of the projection 7 is located in the corresponding region extending between the position corresponding to one third of the entire length from one end of the cutting edge 6 and the position corresponding to two third. That is, the top portion T7 of the projection 7 is located within a range Y shown in FIG. 1(b). Thus, by disposing the projection 7 at the position corresponding to the middle region of the cutting edge 6, the middle portion in width direction of the chips generated by the cutting edge 6 can be lifted, so that the cross-section of the chips can be deformed in the convex shape. The above Y indicates the range extending between the position corresponding to one third of the entire length from one end of the cutting edge 6 and the position corresponding to two third.

Although in the present preferred embodiment, the projection 7 is formed only on the first rake face 31, and the concave part 8 is formed only in the second rake face 32, the invention is not limited thereto. That is, the projection 7 may be formed not only on the first rake face 31 but also the second rake face 32 as long as a part thereof is located on the first rake face 31.

Similarly, the concave part 8 may be formed not only in the second rake face 32 but also the first rake face 31 as long as a part thereof is located on the second rake face 32. In either case, it is important that the concave part 8 is located behind the projection 7. This enables the chips to be deformed so that the cross-section thereof has the convex shape, and also decreases the chips falling into the concave part 8, thus decreasing the frictional resistance in the second rake face 32. When viewed from above, the location of the concave part 8 is not limited to immediately behind the projection 7, and it may be obliquely behind the projection 7.

Preferably, the projection 7 has a substantially ellipsoid shape when viewed from above, namely, a substantially semi-ellipsoid shape. This ensures a stable point contact between the chips and the projection, thereby enhancing the effect on the decrease of the lateral swing of the chips in the chip discharge process.

The substantially semi-ellipsoid shaped projection may be decentered. In order to establish the point contact between the chips and the projection, the projection may have a substantially circular shape when viewed from above, namely, a substantially semispherical shape. The shape of the projection is not limited to these shapes. For example, pyramids with a trapezoidal base such as triangular pyramid with a trapezoidal base and square pyramid with a trapezoidal base, circular cone with a trapezoidal base, ellipsoidal pyramid with a trapezoidal base, or the like. In the projection having any one of the above-mentioned shapes, the head of the projection is preferably constituted by a curved surface in order to produce the above effect.

As shown in FIG. 1(b), when viewed from above, a midpoint M8 of the width of the concave part 8 is located on a straight line X passing a midpoint M6 of the cutting edge 6 and the top portion T7 of the projection 7. That is, when the projection 7 is one in number, the midpoint M8 of a dimension W8 of the concave part 8 (the width of the concave part 8) in the direction along the cutting edge 6 is located on the straight line X passing the midpoint M6 of the cutting edge 6 and the top portion T7 of the projection 7, when viewed from above. That is, the midpoint M6 of the cutting edge 6 and the midpoint M8 of the dimension W8 of the concave part 8 and the top portion T7 of the projection 7 are located on the same straight line X. In other words, the concave part 8 is formed immediately behind the projection 7. This achieves a well-balanced frictional resistance exerted onto the chip widthwise opposite ends in the second rake face 32. Specifically, it is capable of decreasing occasions where the chips whose cross-section is deformed into the convex shape by the projection 7 fall into the concave part 8, thereby enhancing the effect on the decrease of the frictional resistance in the second rake face 32. As a result, the chips can be stably curled on the second rake face 32 where the concave part 8 is formed.

The straight line X is the perpendicular bisector of the cutting edge 6. Thereby, the chips deformed on the first rake face 31 are contacted with the second rake face 32 at the chip widthwise opposite ends. At this time, the balance of frictional resistance exerted onto the chip widthwise opposite ends can be improved, thereby decreasing the lateral swing of the chips in the chip discharge process. Additionally, because the projection 7 and the concave part 8 are sequentially arranged along the chip discharge direction, the effect on stabilization of the chip discharge direction is further enhanced to improve the chip discharge performance.

As used herein, the term "the top portion T7 of the projection 7" means the uppermost portion of the projection 7 with reference to the first rake face 31, when viewed in a cross section passing the midpoint M6 of the cutting edge 6 of the insert body part 2 and being perpendicular to the cutting edge 6, as shown in FIG. 2. The midpoint M8 of the width of the concave part 8 can be calculated as follows. That is, as shown in FIG. 1(b), the maximum dimension of the concave part 8 in the direction along the cutting edge 6 when viewed from above is employed as a dimension W8 of the concave part 8, and the midpoint of the dimension W8 is employed as the midpoint M8.

When viewed from above, the width of the projection 7 is substantially identical to the width of the concave part 8. That is, the dimension W7 of the projection 7 (the width of the projection 7) in the direction along the cutting edge 6 is substantially identical to the dimension W8 of the concave part 8. This further enhances the effect on the decrease of the lateral swing of the chips in the chip discharge process. This also decreases the chip accumulation into the concave part 8 due to the chips falling into the concave part 8, thereby enhancing the effect on the decrease of the frictional resistance generated in the second rake face 32.

As used herein, the dimension W7 of the projection 7 can be calculated as the dimension W7 of the projection 7 in the direction along the cutting edge 6 when viewed from above, as in the case of the above-mentioned dimension W8 of the concave part 8 described above.

A midpoint of the dimension W7 of the projection 7 in the direction along the cutting edge 6 is calculated similarly to the above-mentioned midpoint M8 of the dimension W8 of the concave part 8, and the obtained midpoint is employed as the midpoint M7 of the dimension W7 of the projection 7. At this time, the top portion T7 of the projection 7 is more preferably located at the midpoint M7 of the dimension W7 of the projection 7, as shown in FIG. 1(b). Thereby, the projection 7 is stably brought into contact with the chip, further enhancing the effect on the decrease of the lateral swing of the chip in the chip discharge process.

The concave part 8 is surrounded by the second rake face 32. That is, the concave part 8 is formed within the second rake face 32 that is arranged inclined. Thereby, even when the work material is a material being rich in extensibility, the downward compressive strength in the chip width direction exerted onto the chip on the second rake face 32 can be decreased. Hence, the strength of the entire insert can be improved, while maintaining the effect on the decrease of the frictional resistance generated in the second rake face 32 by decreasing the chips falling into the concave part 8. As a result, the damage to the insert is decreased to thereby improve tool life.

As shown in FIG. 2, in the cross section of the insert body part 2 passing the perpendicular bisector of the cutting edge 6, an angle θ formed between the internal surface of the concave part 8 and the second rake face 32 is an obtuse angle. This permits a suitable decrease of the frictional resistance in the second rake face 32, and also facilitates machining of the concave part 8. Additionally, the strength of the connection part between the inward surface of the concave part 8 and the second rake face 32 is enhanced, further improving tool life.

As used herein, the term "the inward surface of the concave part 8" means a part of the surface of the concave part 8 which is located inward of the insert body part 2 with respect to the cutting edge 6. That is, the inward surface of the concave part 8 is the surface of the concave part 8 which is located on the side on which the clamp face 4 is disposed. The angle θ is more preferably an obtuse angle approaching 180 degrees in order to enhance the effect on the decrease of the frictional resistance in the second rake face 32. Specifically, the angle θ is preferably 160 to 170 degrees.

The deepest portion of the concave part 8 is located higher than the deepest portion of the rake face 3. This enhances the effect on the decrease of downward deformation of the chip widthwise mid-portion in the second rake face 32, while maintaining the effect on the decrease of the frictional resistance generated in the second rake face 32. This decreases the frictional resistance and decreases the chips falling into the concave part 8, thereby decreasing the chip accumulation and further improving the chip discharge performance. This arrangement is particularly effective when the work material is a material being rich in extensibility.

As used herein, the term "the deepest portion of the concave part 8" means the lowest point P8 in a direction perpendicular to the bottom surface of the insert body part 2, as shown in FIG. 2. Similarly, the term "the deepest portion of the rake face 3" means the lowest, point P3 in a direction perpendicular to the insert seat surface. In the present preferred embodiment, the P8 is arranged higher than the P3 with reference to the insert seat surface.

The height of the projection 7 is larger than the depth of the concave part 8. This enables the generated chips to be effectively deformed so that the cross section thereof has the convex shape, thereby decreasing occasions where the chips fall into the concave part 8 and are accumulated there. This also enables decrease of the contact area between the second rake face 32 and the chip, thereby decreasing the frictional resistance generated in the second rake face 32.

That is, the chip can be deformed to have a large gap in height position between the convex-shaped portion in the chip widthwise mid-portion and the portions of the widthwise opposite ends in the chip cross section. The chip having the large height gap between the mid-portion and both end portions in the chip cross section is less liable to fall into the concave part 8 because the concave part 8 is formed behind the projection 7 and shallower than the height of the projection 7. This further enhances the effect on the decrease of chip accumulation into the concave part 8.

As a result, owing to the decrease of the contact area between the second rake face 32 and the chip, namely, the decrease of the frictional resistance generated in the second rake face 32, the chip accumulation can be effectively decreased. This ensures a suitable balance between the contraction action and the curling action exerted onto the chip on the rake face 3, enabling the chip to be suitably curled by the second rake face 32.

Especially, because the depth of the concave part 8 is arranged smaller than the height of the projection 7, it is capable of decreasing the frictional resistance between the chips and the second rake face 32, and also decreasing the chips falling into the concave part 8 even when the work material is a material being rich in extensibility. Consequently, the stable curling action is exerted onto the chip on the second rake face 32, so that the chip accumulation can be decreased to exhibit excellent chip discharge performance.

As used herein, the term "the height of the projection 7" means a dimension in the height direction of the projection 7. Specifically, it means a dimension H of the projection 7 in a direction perpendicular to a virtual straight line L7 connecting the tip end and the rear end of the projection 7 in a cross section passing the top portion T7 of the projection 7 and being perpendicular to the cutting edge 6, as shown in FIG. 2. That is, when the first rake face 31 where the projection 7 is formed is a flat surface, it is the dimension H in the direction perpendicular to the first rake face 31, with reference to the first rake face 31.

The term "the depth of the concave part 8" means a dimension in the depth direction of the concave part 8. Specifically, it means a dimension D of the concave part 8 in a direction perpendicular to a virtual straight line L8 connecting the tip end and the rear end of the concave part 8, as shown in FIG. 2. That is, when the second rake face 32 where the concave part 8 is formed is a flat surface, it is the dimension D in the direction perpendicular to the second rake face 32, with reference to the second rake face 32.

Second Preferred Embodiment

A second preferred embodiment of the invention will be described with reference to FIGS. 4(a) and 4(b) and FIG. 5. Similar reference numerals have been used in these drawings to denote substantially the same parts as the first preferred embodiment, and the corresponding description is omitted. The same is true for third to fifth preferred embodiments described later.

Figure 4:
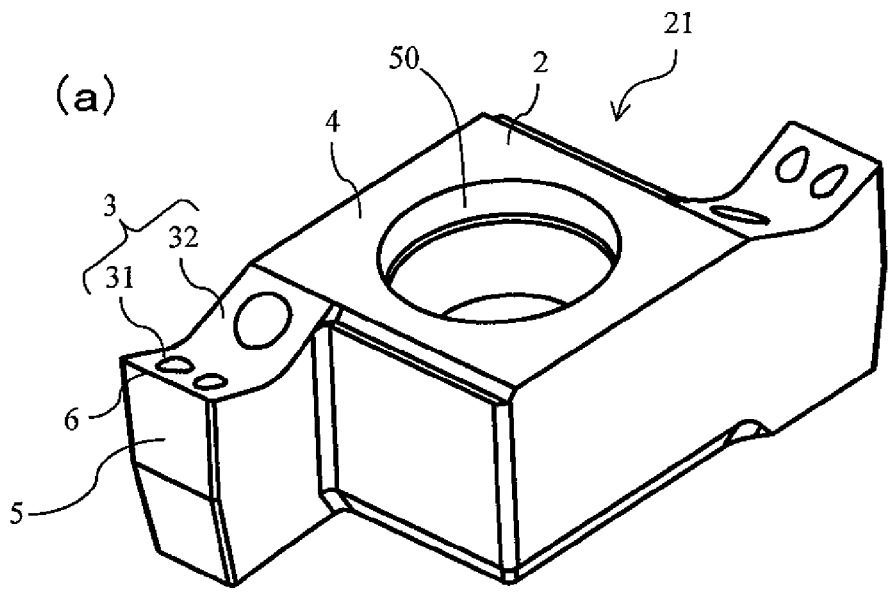
FIG. 4(a) is a perspective view showing the overall cutting insert according to a second preferred embodiment of the invention.
FIG. 4(b) is a plan view thereof.
Figure 4:
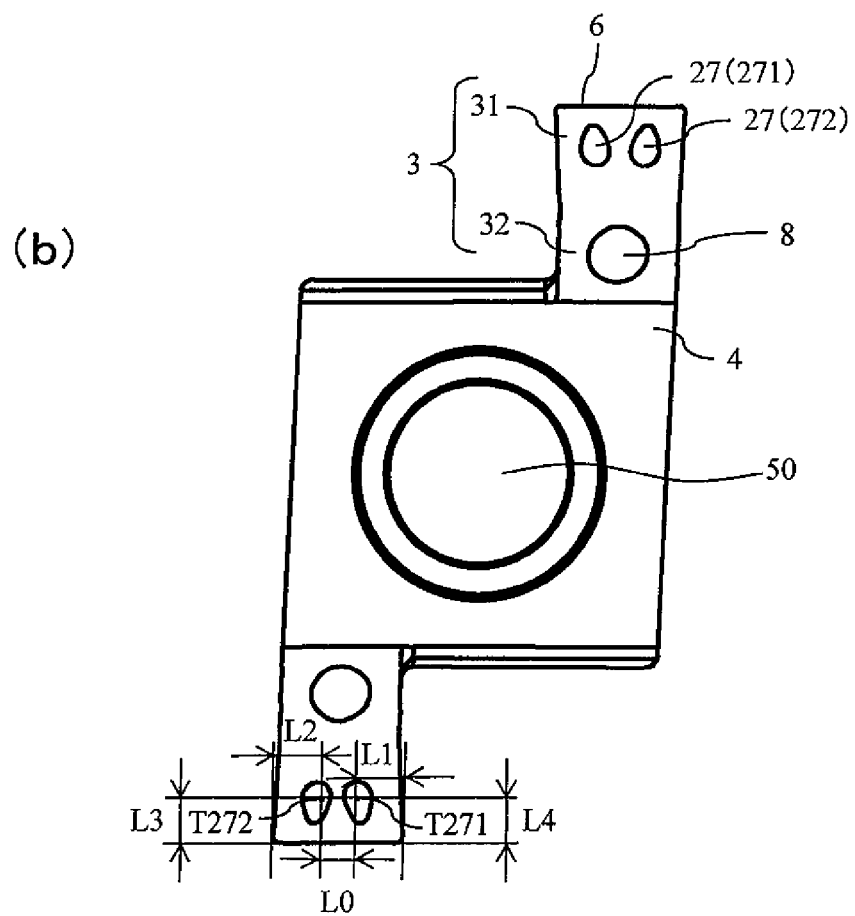

As shown in FIGS. 4(a) and 4(b), unlike the insert 1 of the first preferred embodiment having one projection 7, an insert 21 of the second preferred embodiment has a plurality of projections 27 (271 and 272). At least a part of the plurality of projections 27 is located on a first rake face 31 and formed at a position corresponding to a cutting edge 6. In the present preferred embodiment, these two projections 271 and 272 are formed as the plurality of projections 27.

The plurality of projections 27 are formed correspondingly to a middle region of the cutting edge 6, not toward both ends of the cutting edge 6, in order to decrease occasions where the generated chips falling into a concave part 8 formed behind these projections 27 and are accumulated into the concave part 8. Like the insert 1 of the first preferred embodiment, top portions (T271 and T272) of these projections 27 are located in the region between the position corresponding to one third of the entire length from one end of the cutting edge 6 and the position corresponding to two third.

When having a plurality of projections 27 as in the present preferred embodiment, they are preferably formed on a rake face 3 so as to have the following relationships.

As shown in FIG. 4(b), when viewed from above, L0 is a distance between the top portion T271 of the first projection 271 in the plurality of projections 27, disposed nearest one end of the cutting edge 6, and the top portion T272 of the second projection 272 disposed nearest the other end of the cutting edge 6; L1 is a distance between the top portion T271 of the first projection 271 and one end of the cutting edge 6 in the direction along the cutting edge 6; and L2 is a distance between the top portion T272 of the second projection 272 and the other end of the cutting edge 6 in the direction along the cutting edge 6. In this case, the distance L0 is smaller than each of the distance L1 and the distance L2. That is, it is preferable to satisfy the following relationships: L0<L1; and L0<L2.

Even for an insert having a long cutting edge, the widthwise mid-portion of the chip generated by the cutting edge is stably deformed into a convex shape, and the chip widthwise opposite ends are stably brought into contact with a second rake face 32. Thus, the frictional resistance between the chip and the second rake face 32 is decreased, enabling the chip to be stably curled upward by the second rake face 32.

Figure 5:
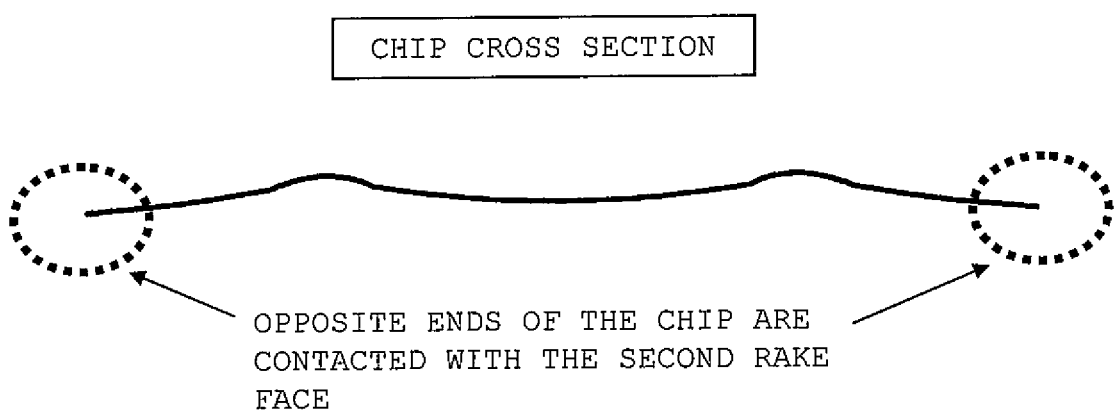
FIG. 5 is a schematic explanatory drawing showing the cross-sectional shape of chips generated by the cutting insert of the second preferred embodiment of the invention.

That is, as shown in FIG. 5, the chip is stably deformed by the plurality of projections 27 so that the chip widthwise mid-portion is lifted to form the convex shape without having the shape that the mid-portion of the chip is recessed than the opposite ends thereof in the chip cross section. This decreases the chips falling into the concave part 8. As a result, high chip discharge performance is exhibited and the frictional resistance generated in the second rake face 32 is decreased, thereby decreasing damage to the insert. This permits improvement of tool life. As used herein, the top portion of each projection 27 is prescribed similarly to the top portion T7 of the projection 7 in the foregoing preferred embodiment.

Although in the present preferred embodiment, the top portions (T271 and T272) of the projections 27 are located toward the back of the projections 27 in a direction perpendicular to the cutting edge 6, as shown in FIG. 4(b), the invention is not limited thereto. Depending on the cutting conditions, the top portion of each projection 27 may be located at a substantially central portion of the projection 27 in the direction perpendicular to the cutting edge 6, or at a position toward the front than the substantially central portion. In either case, the above-mentioned effect can be obtained as long as the distances L0, L1 and L2 satisfy the above relationships.

The distance L1 is preferably smaller than one-half of the distance L1 and the distance L2. That is, the distances L0, L1 and L2 preferably further satisfy the following relationship: $L0<\frac{1}{2}(L1)$: and $L0<\frac{1}{2}(L2)$. Thereby, the chips can be further stably deformed so that the cross section thereof has the convex shape. This produces a good balance between the contraction action and the curling action exerted onto the chips, enhancing the effect on improvement of chip discharge performance.

More preferably, the distance L1 and the distance L2 are substantially the same, namely, satisfy the following relationship: $L1=L2$. This decreases the contact area between the second rake face 32 and the chip, thereby ensuring stable contacts between the second rake face 32 and the chip widthwise opposite ends. Consequently, the chip discharge direction is further stabilized.

Additionally, in the present preferred embodiment having the first projection 271 and the second projection 272, a distance L3 between the top portion T271 of the first projection 271 in the direction perpendicular to the cutting edge 6, and the cutting edge 6 is preferably substantially identical to a distance L4 between the top portion T272 of the second projection 272 in the direction perpendicular to the cutting edge 6, and the cutting edge 6. This enables the generated chips to be stably contacted with the first projection 271 and the second projection 272. Therefore, the opposite ends of the chip are suitably lifted by the first projection 271 and the second projection 272, and the chips can be stably deformed so that the cross section thereof has the convex shape. In the chip discharge process, the lateral swing of the chips can be decreased, thus exhibiting excellent chip discharge performance.

Third and Fourth Preferred Embodiments

Figure 6:
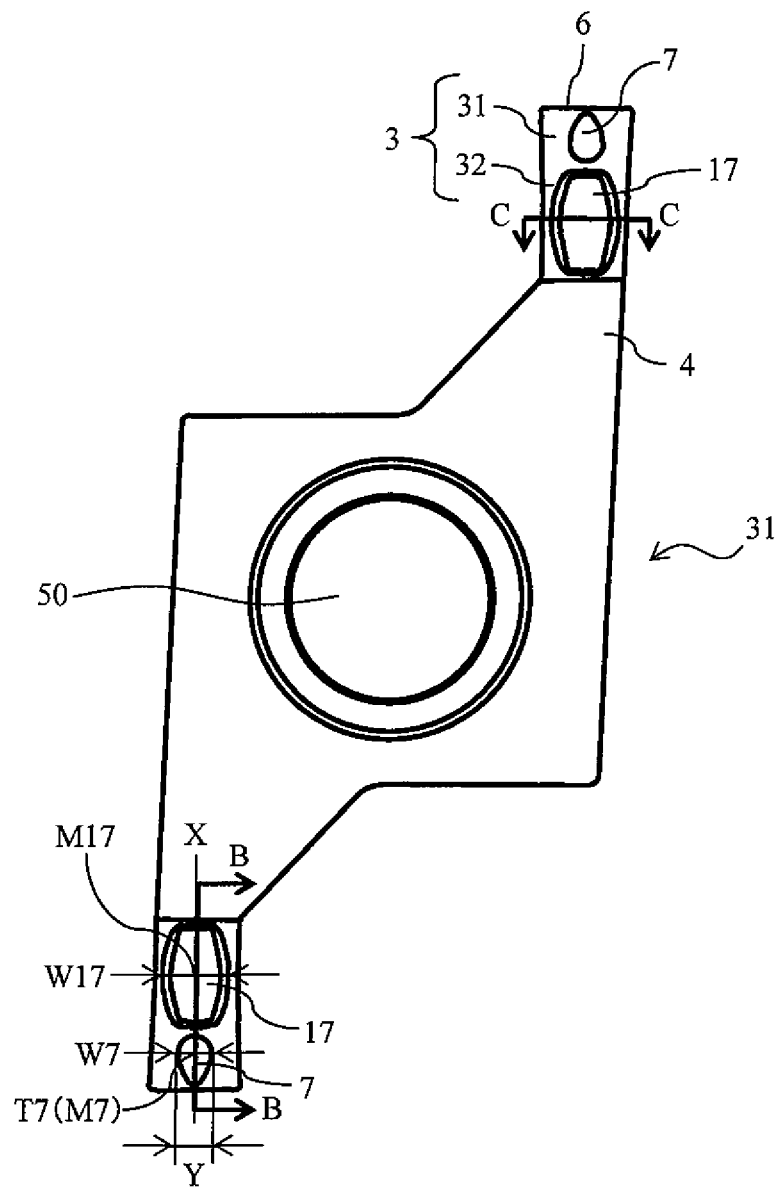
FIG. 6 is a plan view showing a cutting insert according to a third preferred embodiment of the invention.
Figure 7:
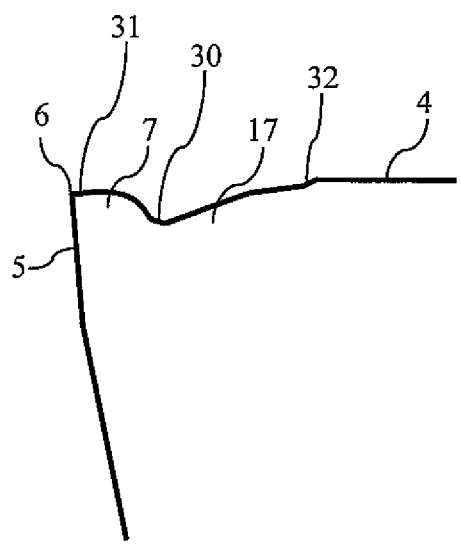
FIG. 7(a) is a sectional view taken along the line B-B in FIG. 6.
FIG. 7(b) is a sectional view taken along the line C-C in FIG. 6.
Figure 7:
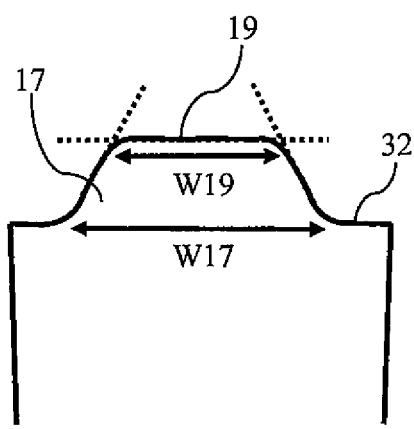

Third and fourth preferred embodiment of the invention will be described with reference to FIG. 6 to FIG. 9(b). Unlike the insert 1 according to the first preferred embodiment in which the concave part 8 is formed in the second rake face 32, a convex part 17 projecting from a second rake face 32 is formed on the second rake face 32 in an insert 31 according to the third preferred embodiment as shown in FIGS. 6 and 7.

By forming the convex part 17 on the second rake face 32 so that the convex part 17 is located toward inward of an insert body part 2 than a projection 7 formed on a first rake face 31, chips having high hardness, whose cross section is deformed into a convex shape by the projection 7, are stably contacted with the convex part 17 on the second rake face 32. Specifically, the opposite ends of the chip shown in FIG. 3 are stably contacted with the convex part 17.

The chips are then stably curled upward by the convex part 17. At this time, the chips are curled through the contact with the convex part 17 projecting from the second rake face 32, and hence the contact area with the second rake face 32 is decreased, thereby decreasing the frictional resistance generated in the second rake face 32. As a result, both the contraction action and the curling action are suitably exerted onto the second rake face 32, and the chip accumulation onto a rake face 3 and a clamp face 4 is decreased, so that tool life can be improved by reducing damage to the insert.

Like the foregoing preferred embodiment provided with the concave part 8, the present preferred embodiment in which the convex part 17 is disposed behind the projection 7 adjacent to a cutting edge 6 is also suitably used when a work material is rich in extensibility. That is, even when the work material is rich in extensibility and hence sufficient work hardening cannot be obtained by the projection 7, the contraction action and the curling action owing to the convex part 17 are obtained, and the chip accumulation is decreased, thereby exhibiting excellent chip discharge performance.

Unlike the preferred embodiment provided with the concave part 8, in the present preferred embodiment provided with the convex part 17, the convex part 17 itself functions as a breaker face to be contacted with the opposite ends of the chip deformed by the first rake face 31.

At this time, a part of the convex part 17 is formed on the first rake face 31. This is suitable when machining the work material being rich in extensibility. That is, the convex part 17 is preferably formed across both the first rake face 31 and the second rake face 32. With this arrangement, the contact area with the first rake face 31 can be decreased even when the work material is rich in extensibility and it is difficult to obtain work hardening. Therefore, the frictional resistance between the chip and the entire rake face 3 is decreased, thus enhancing the effect on reduction of chip accumulation.

In other words, even for chips generated from a work material which is not sufficiently subjected to work hardening by the projection 7, and has small contraction action and high extensibility, it is capable of reducing full contact with the first rake face 31 and the second rake face 32. The chip is smoothly contacted with a portion of the projection 7 which is located on the first rake face 31, and then suitably subjected to the curling action, while decreasing the frictional resistance.

As shown in FIG. 7(b), the top surface of the convex part 17 has a flat portion 19, and the width of the flat portion 19 is larger than the width of the projection 7. That is, a dimension W19 of the flat portion 19 in the direction along the cutting edge 6 (the width of the flat portion 19) is larger than a dimension W7 of the projection 7 in the direction along the cutting edge 6 (the width of the projection) (W19>W7). This ensures stable contacts between the opposite ends of the chip whose cross section is deformed into the convex shape by the projection 7, and the flat portion 19 of the convex part 17. Therefore, the chip discharge direction is stabilized to reduce chip accumulation onto the rake face 3, and also decrease the wear of the convex part 17.

When both ends of the flat portion 19 are connected through a circular arc to the side surface of the convex part 17, the dimension W19 is calculated as shown in FIG. 7(b). That is, in the individual end portions of the flat portion 19, junctions of virtual extensions of straight line portions connected through the circular arc are plotted, respectively, and a distance between the obtained junctions is employed as the dimension W19.

The cross-sectional shape of the convex part 17 substantially parallel to a front flank face 5 (the cross-sectional shape parallel to the cutting edge 6) is a substantial trapezoid with the flat portion 19 as an upper bottom. That is, in the above cross-sectional shape, the dimension W19 of the flat portion 19 is smaller than the dimension W17 of the convex part 17 in the direction along the cutting edge 6 (W19<W17). As used herein, the term "substantially trapezoid" may be those which have a substantially trapezoidal shape with the flat portion 19 as the upper bottom in the above cross-sectional shape, for example, such a shape that the flat portion 19 and the side surface are connected through a circular arc or the like. Thus, the cross-sectional shape having the substantial trapezoid with the flat portion 19 as the upper bottom ensures stable contacts between the opposite ends of the chip whose cross section is deformed into the convex shape as shown in FIGS. 3 and 5, and the top surface of the convex part 17. Additionally, it is capable of reducing occurrence of cracks at the boundary portion between the convex part 17 and the rake face 3. The effect on decrease of the wear of the convex part 17 is also enhanced, further improving tool life.

As used herein, the term "dimension W17" is a so-called width of the projection part 17, specifically means the lower bottom of the substantial trapezoid having a cross-sectional shape substantially parallel to the front flank face 5, as shown in FIG. 7(b).

Figure 8:
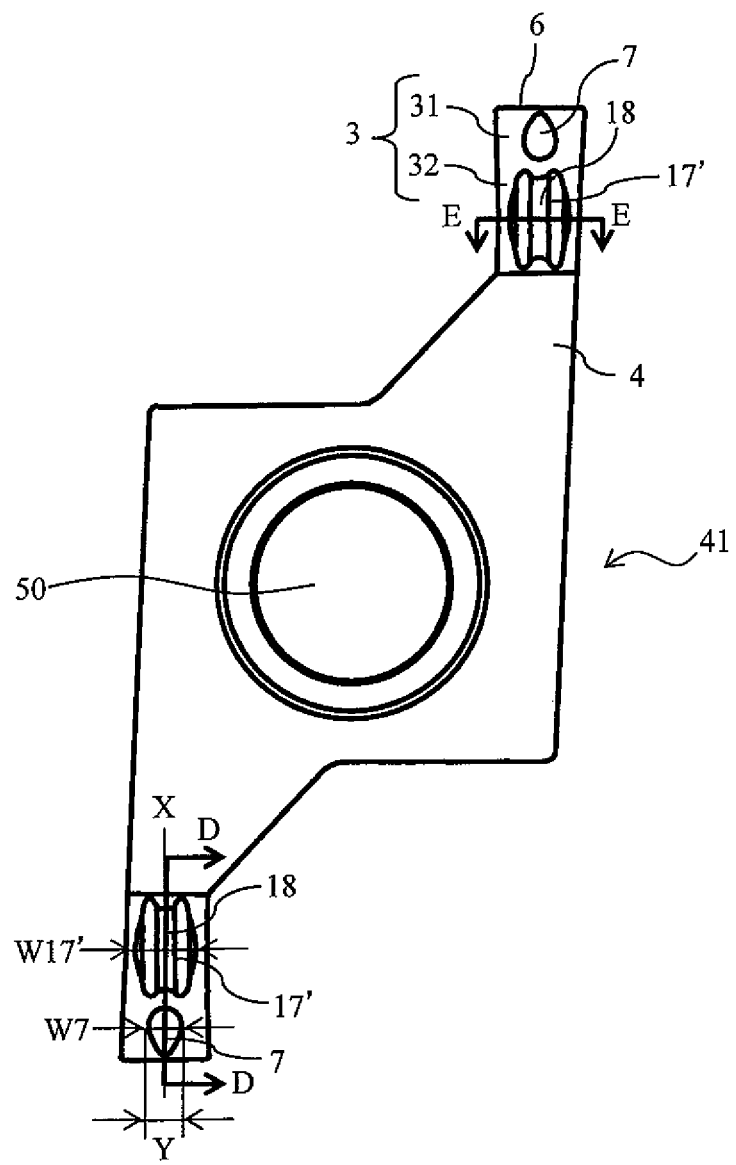
FIG. 8 is a plan view showing a cutting insert according to a fourth preferred embodiment of the invention.
Figure 9:
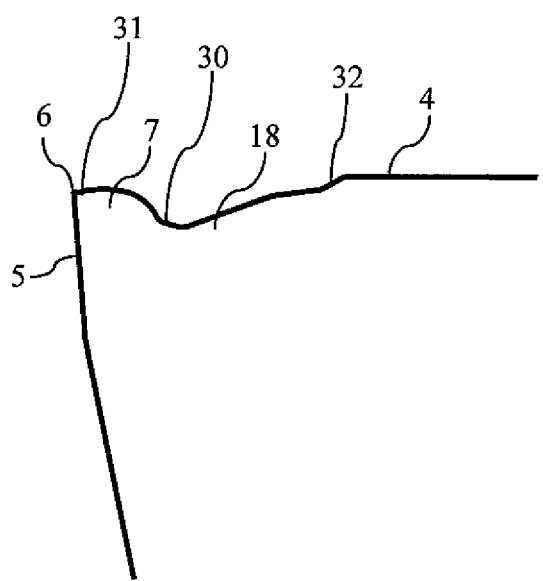
FIG. 9(a) is a sectional view taken along the line D-D in FIG. 8.
FIG. 9(b) is a sectional view taken along the line E-E in FIG. 8.
Figure 9:
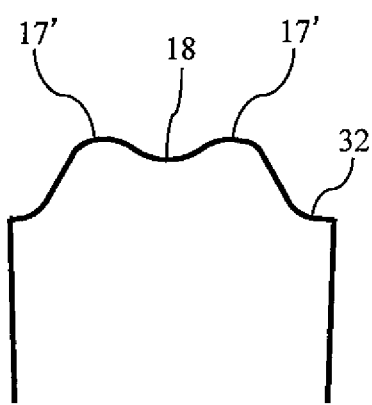

Alternatively, the convex part 17 may have on the top surface thereof a groove 18 extending from the cutting edge 6 toward the clamp face 4, as in the fourth preferred embodiment of the invention shown in FIG. 8 and FIGS. 9(a) and 9(b). That is, the top surface of the convex part 17 may have a shape including convex portions 17' and 17' obtained by dividing the top surface by the groove 18 in the direction along the cutting edge 6. This ensures stable contacts between the opposite ends of the chip whose cross section is deformed into the convex shape by the projection 7, and the convex portions 17' and 17' divided by the groove 18, thereby stabilizing the chip discharge direction. Owing to the groove 18, the contact area between the second rake face 32 and the chip is further decreased. That is, the contact area between the second rake face 32 and the chip is minimized, leaving a portion necessary for the curling action which is brought into contact with the opposite ends of the chip whose cross section is deformed into the convex shape by the first rake face 31.

Like the above-mentioned positional relationship between the projection 7 and the concave part 8, the midpoint M17 of the convex part 17 is located on the straight line X passing the midpoint M6 of the cutting edge 6 and the top portion T7 of the projection 7 in the present preferred embodiment. This stabilizes the chip discharge direction.

Fifth Preferred Embodiment

Figure 10:
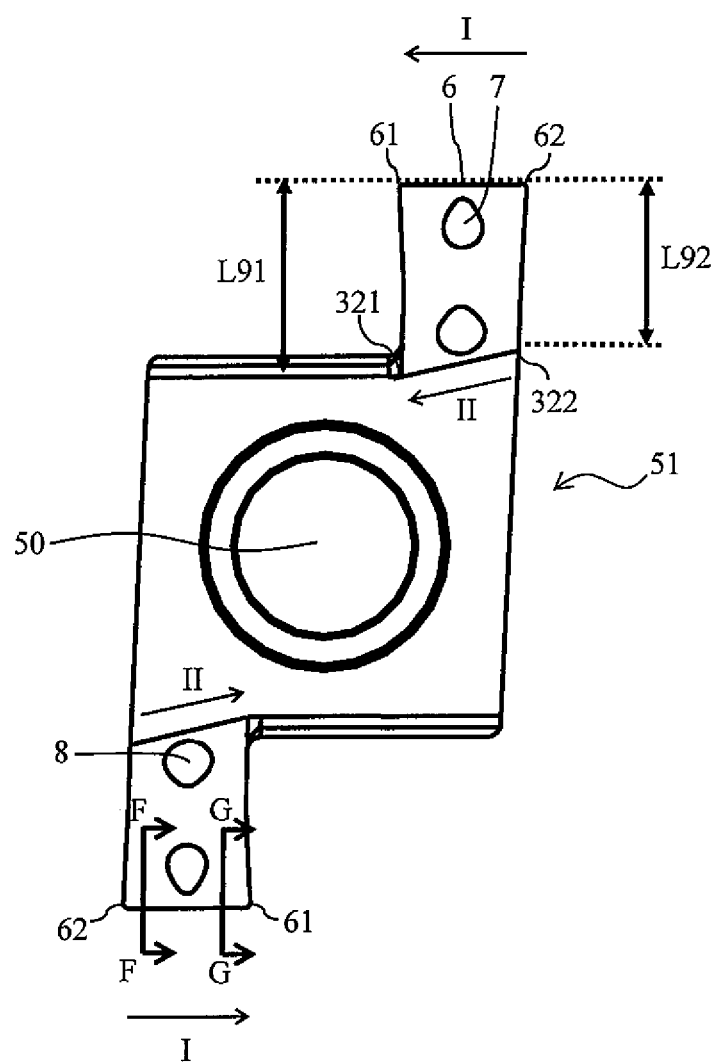
FIG. 10 is a plan view showing a cutting insert according to a fifth preferred embodiment of the invention.

A fifth preferred embodiment of the invention will be described with reference to FIG. 10 and FIGS. 11(a) and 11(b). In an insert 51 of the present preferred embodiment, as shown in FIG. 10, the end portion of a second rake face 32 adjacent to a clamp face 4 is inclined away from a cutting edge 6 (in a direction indicated by an arrow II) from the other end of the cutting edge 6 toward one end (in the direction indicated by an arrow I) when viewed from above. That is, a distance L92 between the other end 62 of the cutting edge 6 and the other end 322 of the end portion of the second rake face 32 adjacent to the clamp face 4, and a distance L91 between one end 61 of the cutting edge 6 and one end 321 of the end portion of the second rake face 32 adjacent to the clamp face 4 satisfy the following relationship L92<L91. As used herein, the term "distances L91 and L92" means dimensions in a direction perpendicular to the cutting edge 6, respectively.

In the present preferred embodiment in which the second rake face 32 and the clamp face 4 are continuously disposed, the term "the end portion of the second rake face 32 adjacent to the clamp face 4" means a crossed ridge between the second rake face 32 and the clamp face 4. When other face region is disposed between the second rake face 32 and the clamp face 4, the end portion of the second rake face 32 adjacent to the clamp face 4 means a crossed ridge between the second rake face 32 and the above other face region.

By forming the rake face 3 satisfying the relationship L91<L92, when the work-hardened chip under the contraction action by the projection 7 is curled upward by the second rake face 32, the chip can be discharged toward a rake face region located toward the one end 61 of the cutting edge 6. That is, the chip discharge direction can be controlled so that the chip subjected to the contraction action by the first rake face 31 is headed for the one end 321 of the second rake face 32. Consequently, the chip is stably discharged to the opening side of a work material where a large chip discharge space is ensured, thereby reducing the chip clogging within the machined groove. This reduces occasions where the chip impairs the machined wall surface, thus improving machining accuracy.

Figure 11:
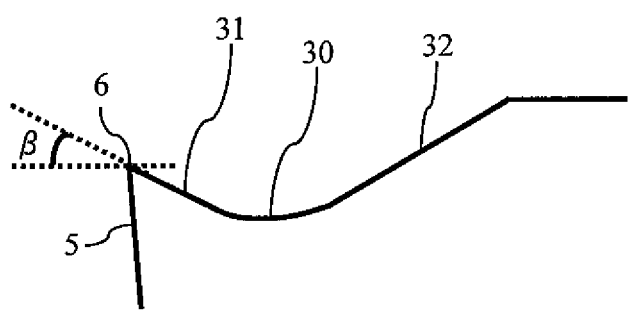
FIG. 11(a) is a sectional view taken along the line F-F in FIG. 10; 0FIG. 11(b) is a sectional view taken along the line G-G in FIG. 10.
Figure 11:
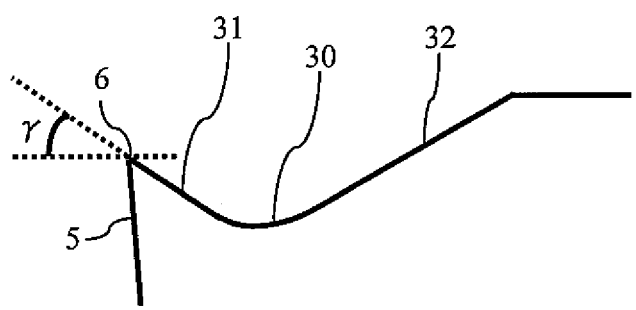

As shown in FIGS. 11(a) and 11(b), the rake angle of the first rake face 31 is preferably larger at the one end 61 (the rake angle γ) than the other end 62 (the rake angle β) (β<γ). More preferably, the rake angle of the first rake face 31 is increased from the other end 62 of the cutting edge 6 toward the one end 61. With this arrangement, the discharge direction of the work-hardened chip subjected to the contraction action by the projection 7 can be headed for the one end 321 in the end portion of the second rake face 32 adjacent to the clamp face 4.

That is, because the rake angle γ at the one end 61 of the cutting edge 6 is larger than the rake angle β at the other end 62, the thickness of a chip generated at the one end 61 of the cutting edge 6 is smaller than that at the other end 62, and the chip generation rate becomes higher. Therefore, the chip at the one end 61 having a smaller thickness and high generation rate is firstly subjected to the curling action by the second rake face 32. Hence, the locus of the chip discharge direction is located above and becomes a counterclockwise spiral form when viewed from above. It is therefore capable of stably discharging the chip toward the one end 61 of the cutting edge 6 where a relative large discharge space is ensured. Like the above-mentioned shape of the second rake face 32, it is capable of reducing occasions where the chips clog within the machined groove and impairs the machined wall surface.

Although the present preferred embodiment illustrates the case where one projection 7 is formed, also in a preferred embodiment where two projections 7 are formed as in the second preferred embodiment, the rake angles β and γ more preferably satisfy the above relationship in order to exhibit excellent chip discharge performance. That is, the projections 7 corresponding to the opposite ends of the chips having different chip generation rates are stably deformed by the first rake face 31, and then smoothly discharged to the second rake face 32.

Additionally, the above gradual change of the rake angle of the first rake face 31 realizes the structure that the other end 62 of the cutting edge 6 has high cutting edge strength, and the one end 61 has small cutting force, thereby exhibiting excellent cutting performance.

As used herein, the term "the rake angle of the first rake face 31" means, as shown in FIGS. 11(a) and 11(b), angles (β, γ) formed between the first rake face 31 and a reference line passing the cutting edge 6 and being parallel to the bottom surface in a cross section perpendicular to the cutting edge 6.

In the present preferred embodiment, the end portion of the second rake face 32 adjacent to the clamp face 4 is formed inclined, and the rake angle of the first rake face 31 is gradually changed. The invention is not limited thereto, and may have either one alone.

The above inserts according to the foregoing preferred embodiments are applicable to both inner diameter groove machining (inner diameter machining) and outer diameter groove machining (outer diameter machining). For improving the usability of the invention, these inserts are suitably used for the inner diameter machining in which the accumulated chip is susceptible to clogging between the insert and a work material. As a work material, materials being rich in extensibility are suitable. Examples thereof include austenitic stainless steel (such as SUS304) and chromium-molybdenum steel (such as SCM435). Among others, chromium-molybdenum steel is preferred. The inserts of the respective preferred embodiments can exhibit excellent chip discharge performance even for materials being rich in extensibility.

As the insert body part 2 of each of the foregoing preferred embodiments, it is possible to use those in which a film is formed on a sintered body, such as hard metal, cermet or ceramics. The film is aimed at improving the wear resistance, and the fracture resistance, or the like of the insert. Examples of the composition thereof include titanium-based compounds such as titanium carbide, titanium nitride and titanium carbon nitride, and alumina. The film may be made up of at least one layer, or a plurality of layers. As the insert body part, without limiting to those having the film formed thereon, those constructed from a sintered body such as hard metal, cermet or ceramics, having no film formed thereon, may be used.

As the case where a plurality of projections are formed, the second preferred embodiment shows the case where the two projections 27 are formed. The invention is not limited thereto. Alternatively, three, four, or more projections may be formed.

The bases of the projections 7 and 27 illustrated above are formed so as to intersect with the rake face 3 across the entire circumference thereof. That is, the projection 7 and the projection 27 are those formed in an isolated island shape on the rake face 3. The invention is not limited thereto. When a plurality of projections are formed, these projections may be integrally formed, that is, arranged so that a partial peripheral surface of a first projection intersects with the peripheral surface of a second projection adjacent to the first projection. This arrangement improves the strength of the projections, thereby improving tool life. Also in the case where the plurality of projections are integrally formed, the top portions of these projections can be prescribed as described above.

<Cutting Tool>

Figure 12:
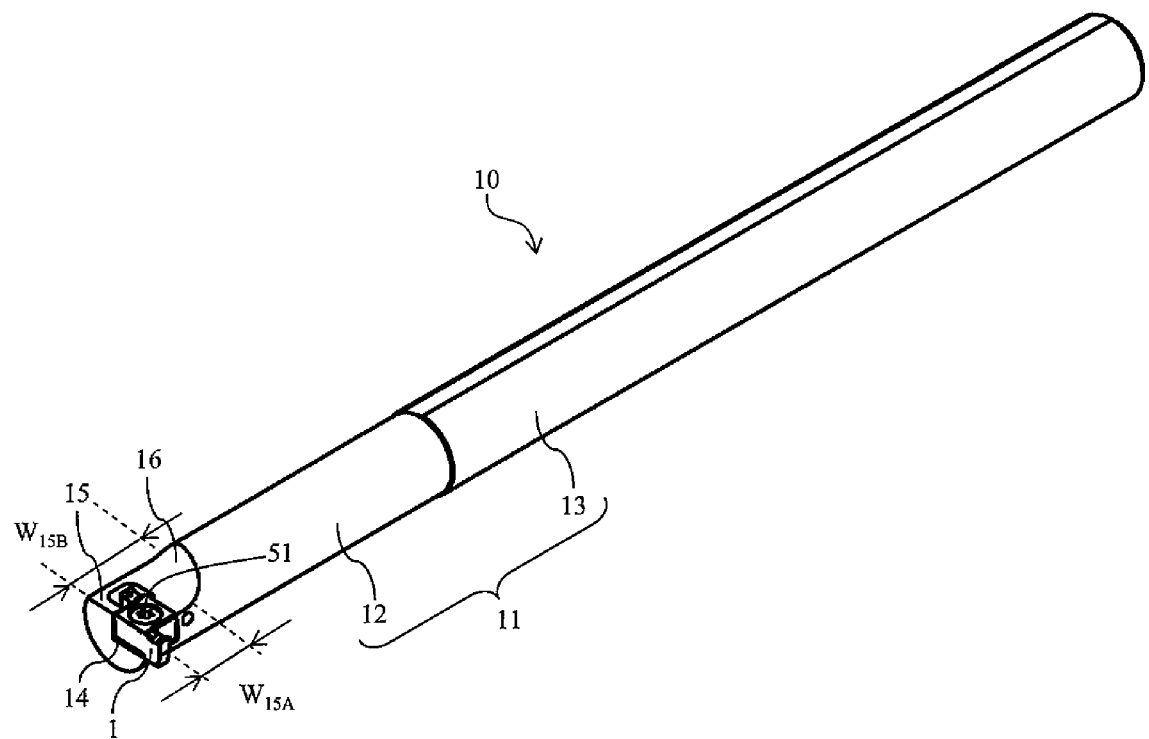
FIG. 12 is a perspective view showing the overall of a cutting tool according to a preferred embodiment of the invention.

A preferred embodiment of the cutting tool of the invention will be described with reference to FIG. 12. The cutting tool 10 of the present preferred embodiment is provided with the insert 1 of the first preferred embodiment, and a holder 11 that mounts the insert 1 onto the tip end thereof.

The holder 11 has a substantially bar shape, specifically a substantially cylindrical shape. The holder 11 is made up of a tip end part 12 and a support part 13 for securing the holder 11 on an external equipment. The tip end part 12 has an insert mounting seat 14 onto which the insert 1 is mounted, a tip end top surface 15 located lower than the clamp face 4 of the insert 1 mounted onto the insert mounting seat 14, and an inclined part 16 which extends continuously with the tip end top surface 15 and is inclined higher toward the support part 13.

The insert 1 is mounted onto the insert mounting seat 14 so that the cutting edge 6 is projected from the outer circumference of the holder 11. Specifically, the insert 1 is mounted onto the holder 11 by inserting a screw 51 into the through hole 50 of the insert body part 2, and screwing the screw 51 into a screw hole formed in the insert mounting seat 14. The mounting method of the insert 1 onto the holder 11 is not limited to the screw fastening illustrated above, and various clamp mechanisms are applicable.

The tip end top surface 15, which is located lower than the clamp face 4 when the insert 1 is mounted by screw fastening, is disposed at the tip end part 12 of the holder 11. This ensures a large chip discharge space above the tip end part 12 of the holder 11. It is therefore capable of decreasing occasions where the chip generated by the cutting edge 6 and then deformed and curled by the first rake face 31 and the second rake face 32 are thereafter accumulated on the top surface of the insert and the tip end top surface of the holder, so that the chip can be smoothly discharged outside the tool.

The tip end top surface 15 is disposed so that a width W15B in the back of the chip discharge direction is larger than a width W15A in the front of the chip discharge direction (W15A<W15B). This improves chip discharge performance.

By disposing the inclined part 16 at the tip end part 12, the large chip discharge space is ensured to further improve the chip discharge performance.

The above cutting tool 10 decreases chip accumulation on the rake face 3 of the insert, thereby improving the chip discharge performance and decreasing cutting force. Hence, the damage to the insert 1 and chip biting can be decreased, thus improving finished face accuracy. Especially, because the lateral swing of chips in the chip discharge process can be decreased, even in the inner diameter groove machining in which the chip discharge space is narrow due to the machining form thereof, the damage to the work material due to the chip can be decreased, thus improving the finished surface accuracy. This ensures long-term stable groove machining.

<Method of Cutting Work Material>

Figure 13:
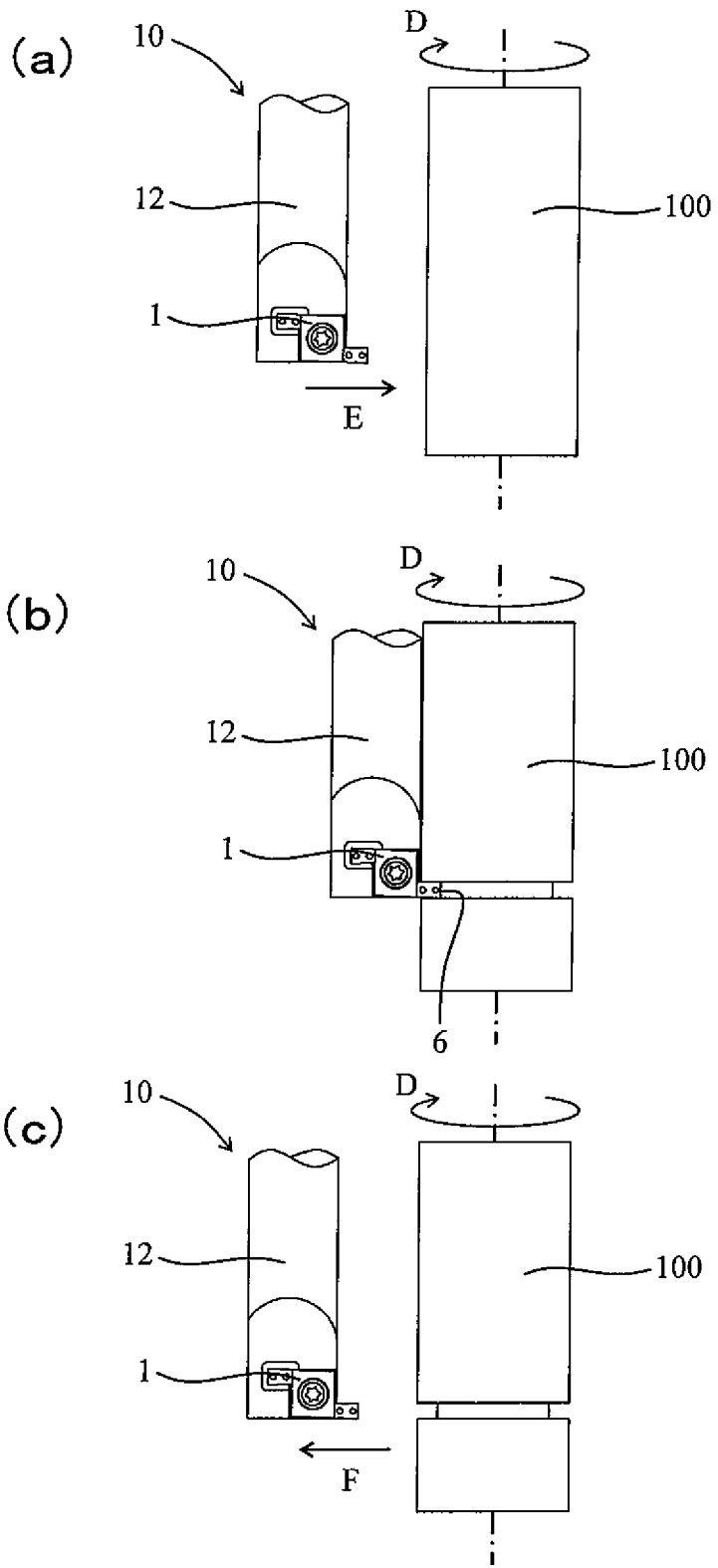
FIGS. 13(a) to 13(c) are schematic explanatory drawings showing a method of cutting a work material according to a preferred embodiment of the invention.

Referring to FIGS. 13(a) to 13(c), a preferred embodiment of the method of cutting a work material according to the invention will be described taking the case of using the cutting tool 10 as an example. The method of cutting a work material of the present preferred embodiment includes the following steps (i) to (iv):

(i) the step of rotating a work material 100 in a direction indicated by an arrow D, as shown in FIG. 13(a);

(ii) the step of bringing the cutting tool 10 near the work material 100 by moving the cutting tool 10 in a direction indicated by an arrow E;

(iii) the step of cutting the work material 100 by bringing the cutting edge 6 of the cutting tool 10 into contact with the work material 100, as shown in FIG. 13(b) (outer diameter machining); and (iv) the step of keeping the cutting tool 10 away from the work material 100 by moving the cutting tool 10 in a direction indicated by an arrow F, as shown in FIG. 13(c).

The above step (iii) is carried out using the cutting tool 10 having excellent chip discharge performance and excellent finished surface accuracy, thus enabling machining of high cutting performance and also improving machining efficiency. Even for the work material being rich in extensibility, excellent chip discharge performance can be exhibited, permitting long-term stable cutting.

In the above step (i), the work material 100 and the cutting tool 10 may be relatively close to each other. For example, the work material 100 may be brought near the cutting tool 10. Similarly, in the above step (iv), the work material 100 and the cutting tool 10 may be relatively away from each other. For example, the work material 100 may be moved away from the cutting tool 10. When the cutting is continued, the step of bringing the cutting edge 6 of the cutting tool 10 into contact with different points of the work material 100 may be repeated, keeping the work material 100 rotating. When the cutting edge in use is worn, an unused cutting edge may be used by rotating the insert 1 180 degrees with respect to the central axis of the through hole 50.

While the several preferred embodiments of the invention have been described and illustrated above, it is to be understood that the invention is not limited to these preferred embodiments and applicable to any other matters without departing from the aim of the invention.

The invention claimed is:
1. A cutting insert comprising:
a cutting edge formed in a ridge part of a top surface of the cutting insert;

a rake face region formed continuously with the cutting edge on the top surface; and a clamp face region located more inward and higher than the rake face region on the top surface, wherein a first rake face formed continuously with the cutting edge on the rake face region;

a second rake face formed in an inclined surface shape from the first rake face toward the clamp face region, on the rake face region;

a projection being formed so that at least a part of the projection is located on the first rake face, and comprising a top portion disposed at a position corresponding to a middle region of the cutting edge when viewed from above; and a concave part being entirely located on the second rake face, and being located more inward than the projection when viewed from above, wherein the projection is one in number; and when viewed from above, a midpoint of a width of the concave part is located on a straight line X passing a midpoint of the cutting edge and a top portion of the projection.

2. The cutting insert according to claim 1, wherein when viewed above, a width of the projection is substantially identical to a width of the concave part.

3. The cutting insert according to claim 1, wherein the concave part is surrounded by the second rake face.

4. The cutting insert according to claim 1, wherein the height of the projection is larger than the depth of the concave part.

5. A cutting tool comprising:
a cutting insert according to claim 1; and
a holder mounting the cutting insert on a tip end thereof.

6. The cutting tool according to claim 5, wherein the holder comprising a support part mounted to an external equipment, and a tip end portion including an insert mounting seat on which the cutting insert is mounted, and
the tip end portion comprising a tip end top surface which is located lower than the clamp face region of the cutting insert.

7. A cutting insert comprising:
a cutting edge formed in a ridge part of a top surface of the cutting insert;
a rake face region formed continuously with the cutting edge on the top surface; and
a clamp face region located more inward and higher than the rake face region on the top surface, wherein a first rake face formed continuously with the cutting edge on the rake face region;

a second rake face formed in an inclined surface shape from the first rake face toward the clamp face region, on the rake face region;

a projection being formed so that at least a part of the projection is located on the first rake face, and comprising a top portion disposed at a position corresponding to a middle region of the cutting edge when viewed from above; and a concave part being entirely located on the second rake face, and being located more inward than the projection when viewed from above, and the deepest part of the concave part is located higher than the deepest part of the rake face region.

8. The cutting insert according to claim 7, wherein the concave part is surrounded by the second rake face.

9. The cutting insert according to claim 7, wherein the height of the projection is larger than the depth of the concave part.

10. A cutting tool comprising:
a cutting insert according to claim 7; and
a holder mounting the cutting insert on a tip end thereof.

11. The cutting tool according to claim 10, wherein the holder comprising a support part mounted to an external equipment, and a tip end portion including an insert mounting seat on which the cutting insert is mounted, and
the tip end portion comprising a tip end top surface which is located lower than the clamp face region of the cutting insert.

12. A method of cutting a work material by using a cutting tool according to claim 10, the method comprising:
rotating a work material;
moving the cutting tool closer to the work material;
cutting the work material by contacting the cutting edge of the cutting tool with the work material; and
moving the cutting tool away from the work material.

13. A method of cutting a work material by using a cutting tool according to claim 5, the method comprising:
rotating a work material;
moving the cutting tool closer to the work material;
cutting the work material by contacting the cutting edge of the cutting tool with the work material; and
moving the cutting tool away from the work material.

* * * * *